US010216464B2

(12) United States Patent
Arora et al.

(10) Patent No.: US 10,216,464 B2
(45) Date of Patent: Feb. 26, 2019

(54) WIRELESS COMMUNICATION OF PRINT CONTENT AND A MOBILE DEVICE IDENTIFIER

(71) Applicant: Hewlett-Packard Development Company, L.P., Houston, TX (US)

(72) Inventors: Puneet Kumar Arora, New Delhi (IN); Kumaravel Ganesan, Dindigul (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/105,303

(22) PCT Filed: Dec. 20, 2013

(86) PCT No.: PCT/IN2013/000783
§ 371 (c)(1),
(2) Date: Jun. 16, 2016

(87) PCT Pub. No.: WO2015/092801
PCT Pub. Date: Jun. 25, 2015

(65) Prior Publication Data
US 2016/0313954 A1      Oct. 27, 2016

(51) Int. Cl.
*G06F 3/12* (2006.01)
*H04W 12/08* (2009.01)
(Continued)

(52) U.S. Cl.
CPC .......... *G06F 3/1238* (2013.01); *G06F 3/1222* (2013.01); *G06F 3/1292* (2013.01);
(Continued)

(58) Field of Classification Search
CPC ..... H04N 2201/006; H04N 2201/0094; H04N 1/00307; G06F 3/1222; G06F 3/1292; G06F 21/608; G06F 3/1238; H04W 12/08
See application file for complete search history.

(56) References Cited

U.S. PATENT DOCUMENTS 6,654,137 B1 * 11/2003 Yagita .................. G06K 15/002
                                                                 358/1.1
8,189,225 B1    5/2012 Lo et al.
(Continued)

FOREIGN PATENT DOCUMENTS

JP           200788944         4/2007
WO       WO-2014120198       8/2014

OTHER PUBLICATIONS

Cortado, "Personal Printing Essentials: Secure Printing (version 2.0)," Oct, 18, 2012, https://www.cortado.com/> ~ 72 pages.
(Continued)

*Primary Examiner* — Iriana Cruz
(74) *Attorney, Agent, or Firm* — HP Inc. Patent Department (57) ABSTRACT

Examples disclosed herein relate to wireless communication of print content. Examples include a remote printing request acquired by a remote printing server from a mobile device, the remote printing request including first print content and identifying a mobile device identifier. Examples further include second print content and the mobile device identifier acquired via direct wireless communication.

17 Claims, 3 Drawing Sheets

(51) Int. Cl.
*H04N 1/00* (2006.01)
*G06F 21/60* (2013.01)

(52) U.S. Cl.
CPC ....... *G06F 21/608* (2013.01); *H04N 1/00307* (2013.01); *H04W 12/08* (2013.01); *H04N 2201/006* (2013.01); *H04N 2201/0094* (2013.01)

(56) References Cited

U.S. PATENT DOCUMENTS

| | | | |
|---|---|---|---|
| 8,612,558 | B2 | 12/2013 | Schmitz et al. |
| 8,670,532 | B2 * | 3/2014 | Kusakabe .......... H04N 1/00204 358/400 |
| 8,797,563 | B2 * | 8/2014 | Nuggehalli ........... G06F 21/608 358/1.1 |
| 2003/0103229 | A1 | 6/2003 | Weaver |
| 2004/0223186 | A1 | 11/2004 | Ito |
| 2009/0021776 | A1 | 1/2009 | Dolan et al. |
| 2011/0096354 | A1 | 4/2011 | Liu |
| 2011/0173682 | A1 * | 7/2011 | Perry ..................... H04W 12/06 726/4 |
| 2012/0147420 | A1 | 6/2012 | Nishimi et al. |
| 2012/0250076 | A1 * | 10/2012 | Kumar .................. G06F 3/1206 358/1.15 |
| 2013/0027741 | A1 | 1/2013 | Liu |
| 2013/0094047 | A1 * | 4/2013 | Bailey .................... H04L 63/18 358/1.14 |
| 2013/0145420 | A1 | 6/2013 | Ting et al. |
| 2013/0258408 | A1 | 10/2013 | Mizutani |
| 2014/0293314 | A1 | 10/2014 | Amarendra et al. |
| 2015/0153975 | A1 * | 6/2015 | Mori ..................... G06F 3/1206 358/1.14 |

OTHER PUBLICATIONS

Hewlett-Packard Company, "HP Access Control Secure Print Authentication," (Web Page), 2010, http://h71028.www7.hp.com/enterprise ~ 2 pages.

Xerox, Xerox® WorkCentre® 7120/7125 System Administrator Guide., Jul. 2011 ~ First 11 pages of 160 pages.

* cited by examiner

WIRELESS COMMUNICATION OF PRINT CONTENT AND A MOBILE DEVICE IDENTIFIER

BACKGROUND

A printing device, such as a printer, multifunction printer (MFP), or the like, may be utilized to print content on a physical medium such as paper. The printing device may receive an electronic representation of the content from a computing device, such as a desktop or laptop computer, connected to the printing device by a direct, wired connection, for example. In some examples, the printing device may be connected to a computer network and may receive content to be printed via the computer network from a computing device that is not directly connected to the printing device.

BRIEF DESCRIPTION OF THE DRAWINGS

The following detailed description references the drawings, wherein.

DETAILED DESCRIPTION

As noted above, a printing device may receive content to be printed via a computer network. For example, the printing device may be a web-connected printing device capable of printing content received via the Internet from a remote printing service. In such examples, a mobile device (e.g., smart phone, tablet, etc.) may provide a remote printing request to a remote printing service via the Internet, and the remote printing service may provide the content to the printing device if the sender of the request is authorized to print on the printing device via the remote printing service. In some examples, the remote printing request may be provided to the remote printing service as an email including the content, or as an application programming interface (API) function call, for example.

In some examples, the printing device may also be capable of receiving content to print from a mobile device via direct wireless communication, such as near-field communication (NFC), or the like. As such, a printing device may be able to receive content to print from a mobile device via multiple different communication channels. However, in some examples, a sender of content may be authorized by separate processes for each channel. For example, an email address of a user of a mobile device may be added to a whitelist for the printing device to authorize the user to print on the printing device via the remote printing service in connection with the email address. This email address may be added to the whitelist via a first authorization process (e.g., via a web interface for the remote printing service).

However, this process may not authorize the user to provide content to the printing device via direct wireless communication with the mobile device. In such examples, although the user has been authorized to print on the printing device via the remote printing service, the user may be prevented from printing on the printing device via direct wireless communication until another authorization process for the direct wireless communication channel is performed. Utilizing separate authorization processes to authorize printing on the same printing device via different channels may be inconvenient for a user of the printing device.

To address these issues, examples described herein may enable a mobile device to be automatically authorized for direct wireless printing on a printing device when a user of the mobile device, authorized to print to the printing device via the remote printing service, prints to the printing device via the remote printing service.

In examples described herein, a remote printing server of a remote printing service may acquire a remote printing request from a mobile device, the remote printing request comprising first print content and identifying a print request sender, a destination printing device, and a mobile device identifier associated with the mobile device. Examples described herein may further determine that the identified print request sender is authorized to print on at least the destination printing device via the remote printing service and, in response to the determination that the print request sender is authorized, provide a print-ready version of the first print content to the destination printing device for printing. Examples described herein may further provide authorization information to the destination printing device to authorize printing of at least second print content received by the destination printing device from the mobile device via direct wireless communication, when at least the mobile device identifier is provided by the mobile device to the destination printing device via the direct wireless communication in association with the second print content.

In this manner, examples described herein may automatically authorize a mobile device to print from a printing device via direct wireless communication when a sender associated with the mobile device is already authorized to print on the printing device via the remote printing service.

Figure 1:
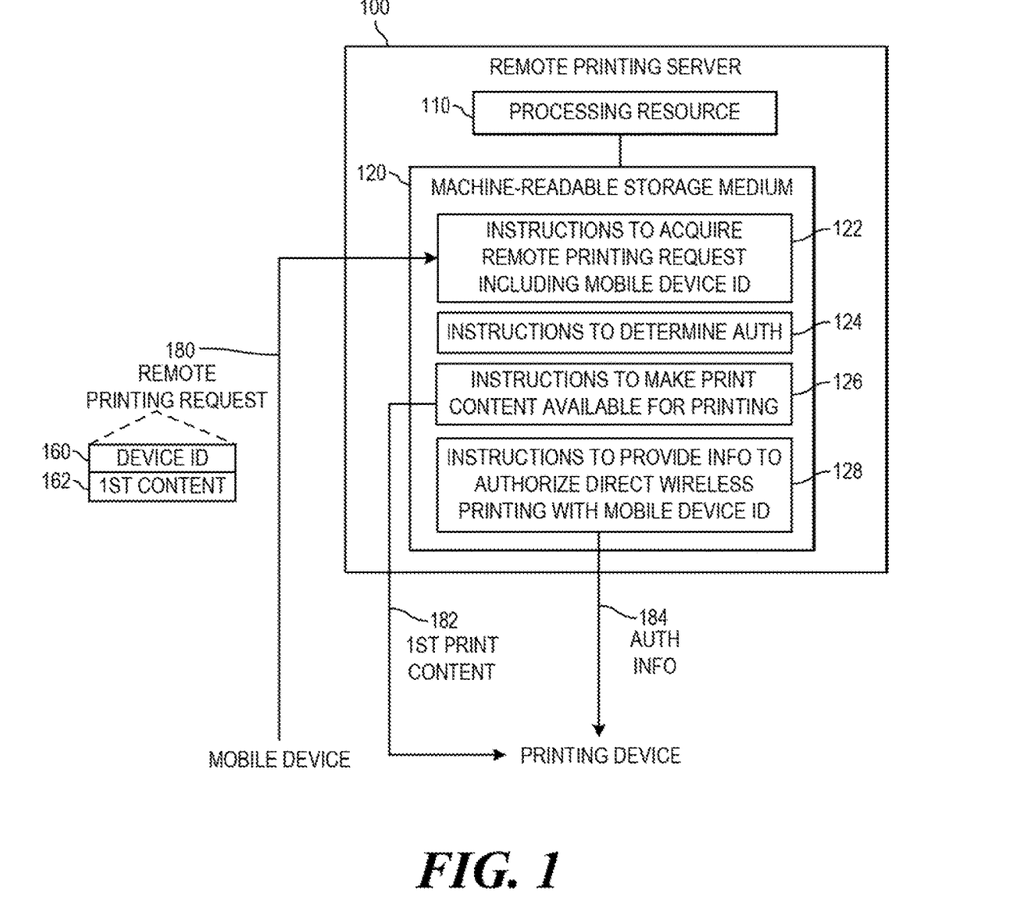
FIG. 1 is a block diagram of an example computing device to authorize printing of print content received via direct wireless communication.

Referring now to the drawings, FIG. 1 is a block diagram of an example computing device 100 to authorize printing of print content received via direct wireless communication. As used herein, a "computing device" may be a desktop computer, notebook computer, workstation, tablet computer, mobile phone, smart device, server, blade enclosure, printing device, or any other processing device or equipment. In the example of FIG. 1, computing device 100 maybe a remote printing server 100 to at least partially implement a remote printing service.

In examples described herein, a "remote printing service" may be a service implemented by one or more networked computing devices to receive a print request from a sending computing device and provide content associated with the request to a destination printing device, wherein the sending computing device and the printing device are each remote from the networked computing device(s) implementing the remote printing service. In examples described herein, first computing device "remote" from a second computing device may be a first computing device that is separate from, and not directly connected to, the second computing device, wherein the first and second computing devices may access one another over a computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In the example of FIG. 1, remote printing server 100 includes a processing resource 110 and a machine-readable storage medium 120 encoded with instructions 122, 124, 126, and 128. In some examples, storage medium 120 may include additional instructions. In some examples, instructions 122, 124, 126, and 128, and any other instructions described herein in relation to storage medium 120, may be stored on a machine-readable storage medium remote from but accessible to computing device 100 and processing resource 110 (e.g., via a computer network).

In examples described herein, a processing resource may include, for example, one processor or multiple processors included in a single computing device or distributed across multiple computing device. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.) a remote printing request 180 from a mobile device via any suitable computer network. Remote printing server 100 and the mobile device may communicate via any suitable computer network. As used herein, a "mobile device" may be a mobile phone, smart device (e.g., smartphone), tablet computer, laptop, or any other computing device including a portable energy source (e.g., battery, etc.) capable of powering the device when not connected to an external power source. Remote printing request 180 may comprise first print content 162 to be printed and identify a mobile device identifier 160 associated with the mobile device. Remote printing request 180 may further identify a print request sender and a destination printing device to print the first print content 162. In some examples, remote printing request 180 may include first print content 162 and mobile device identifier 160.

In examples described herein, a mobile device identifier may be any information identifying the mobile device. Example mobile device identifiers may include, for example, a mobile device's International Mobile Station Equipment Identity (IMEI) number, serial number or other product-specific number, unique device ID (UDID), an operating system (OS) identifier, a machine address (MAC), or the like, or a combination thereof. In some examples, the mobile device identifier may be information associated with the mobile device that is at least one of unique across mobile devices and not alterable or replaceable by a user of the mobile device.

In some examples, remote printing request 180 may comprise an email (i.e., at least one electronic mail message) sent by the mobile device. In such examples, the email may include the mobile device identifier 160 and the first print content 162, and may identify the print request sender and the destination printing device. For example, first print content 162 may be included as an attachment to the email, and mobile device identifier 160 may be included in a header of the email (e.g., in custom metadata of the header). In some examples, the email may include an email address of the sender (e.g., the address in the "From" field of the email header), which may identify the print request sender. The email may also include an email address associated with (e.g., assigned to) the destination printing device (e.g., the address in the "To" field of the email header, or the like), which may identify the destination printing device.

In other examples, remote printing request 180 may, comprise an API function call, such as a call to a print request function of an API of the remote printing service. In such examples, the API function call may comprise first print content 162 and the destination printing device, and may identify the print request sender and mobile device identifier 160 in any suitable manner. For example, the API function call may include first print content 162, an identifier for the destination printing device, and a security token (or any other suitable information) associated with the print request sender and mobile device identifier 160. In such examples, the remote printing server may determine the print request sender and mobile device identifier 160 based on the security token. In some examples, the API function call may be provided to remote printing server 100 via hypertext transfer protocol (HTTP), or any other suitable protocol. In such examples, instructions 122 may acquire the API function call 280 (as the remote printing request 280) from a printing application of the mobile device.

Instructions 124 may determine that the identified print request sender is authorized to print on at least the identified destination printing device via the remote printing service. For example, the remote printing service may maintain a list (e.g., a whitelist) of authorized senders for the identified destination printing device. In such examples, server 100 may provide print content received in a remote printing request to the identified destination printing device when the sender identified in the request is included in the list. In such examples, in response to receiving a remote printing request, instructions 124 may access a whitelist for the identified destination printing device and determine whether the sender identified in the print request is authorized to print on the destination printing device via the remote printing service. In other examples, instructions 124 may determine that the identified print request sender is authorized to print on a plurality of printing devices associated with the remote printing service, including the destination printing device. For example, in response to a determination or indication that a security token included in the print request is a valid security token (e.g., from a security service), and in response, instructions 124 may determine that the identified print request sender is authorized to print on a plurality of printing devices associated with the remote printing service, including the destination printing device.

In the example of FIG. 1, instructions 124 may determine that the identified print request sender of request 180 is authorized to print on the identified destination printing device via the remote printing service. For example, in an example in which the remote printing request 180 is an email, instructions 124 may access a whitelist for the identified destination printing device (e.g., associated with the destination email address), determine that the email address of the sender is included the whitelist and thereby determine that the print request sender is authorized to print on the destination printing device via the remote printing service.

Based on the determination that the print request sender is authorized, instructions 126 may make a print-ready version 182 of the first print content 162 available to the destination printing device for printing in any suitable manner. In some examples, instructions 126 may make the print-ready version 182 available by storing the print-ready version 182 in storage accessible to the destination printing device via a computer network, and providing, to the printing device, information the printing device may use to retrieve the print-ready version 182, such as a uniform resource identifier (URI), uniform resource locator (URL), or other any other suitable type of address or reference. In other examples, instructions 126 may make the print-ready version 182 available by providing the print-ready version 182 to the destination printing device.

In examples described herein, a "printing device" may be a hardware device, such as a printer, multifunction printer (MFP), or any other device including at least functionalities to physically produce graphical representation(s) (e.g., text, images, etc.) on paper, or the like. In same examples, an MFP may be capable of performing a combination of multiple different functionalities such as, for example, printing, photocopying, scanning, faxing, etc. In examples described herein, a printing device may be capable of communicating over, a computer network, such as the internet, or the like. Such a printing device may be referred to herein as a "web-connected" printing device.

In examples described herein, a "print-ready" version of print content for a given printing device may be a version of the print content in a form that may be printed by the given printing device. For example, a given printing device may be able to print documents in one or more of portable document format (PDF), at least one version of printer command language (PCL) format, or the like. A document in any such format that may be printed by a given printing device may be considered a "print-ready" version of the document for that printing device. A document in a format that may not be printed by a given printing device (e.g., a word processing document format, or the like), may not be considered a print-ready version of the document. In such examples, the document may be rendered (converted, or the like) into a print-ready format for the destination printing device before being made available to the printing device. In such examples, the remote printing service (e.g., instructions 126, or a computing device separate from but accessible to server 100) may render the document to produce the print-ready version to provide to the printing device.

In some examples, first print content 162 included in request 18 may be in a print-ready format for the destination printing device. In such examples, print-ready version 182 is equivalent to first print content 162. In other examples, first print content 162 included in request 180 may not be in a print-ready format for the destination printing device, and first print content 162 may be rendered to produce a print-ready version 182 of first print content 162 to provide to the destination printing device.

In the example of FIG. 1, instructions 128 may provide authorization information 184 to the destination printing device to authorize printing of at least second print content received by the destination printing device from the mobile device via direct wireless communication, when at least the mobile device identifier 160 is, provided by the mobile device to the destination printing device via the direct wireless communication in association with the second print content. Remote printing server 100 and the destination printing device may communicate via any suitable computer network. In such examples, instructions 128 may provide authorization information 184 to the destination printing device via any suitable computer network.

In examples described herein, "direct wireless communication" may be any form of wireless communication that may be performed directly between a wireless interface of a mobile device and a wireless interface of a printing device (e.g., without any intervening computing device, component, or the like). Examples of direct wireless communication may include, for example, near field communication (NFC), Bluetooth, Bluetooth low energy (BLE), ad hoc WI-FI, WI-FI DIRECT, or the like. In some examples, the direct wireless communication may be close-proximity direct wireless communication, which may be any type of short-range wireless communication having a range of about ten centimeters (10 cm) or less, such as NFC. In some examples, close-proximity direct wireless communication, may be a type of wireless communication having a range of about four centimeters (4 cm) or less.

In the example of FIG. 1, authorization information 184, provided by instructions 128, may comprise any suitable information to cause the destination printing device to authorize printing of at least second print content received, with mobile device identifier 160, via direct wireless communication from a mobile device.

In some examples, the destination printing device may maintain an authorization list indicating mobile device identifiers associated with mobile devices authorized to print on the destination printing device via direct wireless communication. In such examples, when the destination printing device receives print content with a mobile device identifier via direct wireless communication, the destination printing device may check the authorization list of for the provided mobile device identifier, and may print the print content if the provided mobile device identifier is in the authorization list. In such examples, authorization information 184 may include mobile device identifier 160.

In such examples, instructions 128 may provide mobile device identifier 160 to the destination printing device such that the destination printing device stores mobile device identifier 160 in the authorization list stored in local memory of the destination printing device, to authorize the mobile device associated with mobile device identifier 160 is authorized to print on the destination printing device via direct wireless communication. In some examples, instructions 128 may provide mobile device identifier 160 to the destination printing device in an API function call of an API of the destination printing device to cause the destination printing device to store mobile device identifier 160 in the authorization list. In some examples, instructions 128 may provide mobile device identifier 160 to the destination printing device to authorize the associated mobile device to print via direct wireless communication in response to a determination by instructions 124 that the identified sender of request 180 is authorized to print on the identified destination printing device via the remote printing service.

In other examples, when the destination printing device receives print content with a mobile device identifier via direct wireless communication, the destination printing device may contact the remote printing service to determine whether a mobile device associated with the provided mobile device identifier is authorized to print via direct wireless communication. In such examples, the destination may provide the received mobile device identifier to remote printing server 100 with a request for authorization information. In such examples, instructions 128 may determine whether the mobile device is authorized and, based on the determination, instructions 128 may provide authorization information 184 indicating whether or not the mobile device (associated with the received mobile device identifier) is authorized to print on the destination printing device via direct wireless communication. In such examples, if instructions 128 provide authorization information 184 indicating that the mobile device is authorized, then destination printing device may print the print content provided with the mobile device identifier via direct wireless communication. If instructions 128 provide authorization information 184 indicating that the mobile device is not authorized, then destination printing device may not print the print content.

In some examples, instructions 122, 124, 126, and 128, may be part of an installation package that, when installed, may be executed by processing resource 110 to implement the functionalities described herein in relation to instructions 122, 124, 126, and 128. In such examples, storage medium 120 may be a portable medium, such as a CD, DVD, or flash drive, or a memory maintained by a server from which the installation package can be downloaded and installed. In other examples, instructions 122, 124, 126, and 128may be part of an application, applications, or component already installed on remote printing server 100 including processing resource 110. In such examples, the storage medium 120 may include memory such as a hard drive, solid state drive, or the like. In some examples, functionalities described herein in relation to FIG, 1 may be provided in combination with functionalities described herein in relation to any of FIGS. 2-4.

Figure 2:
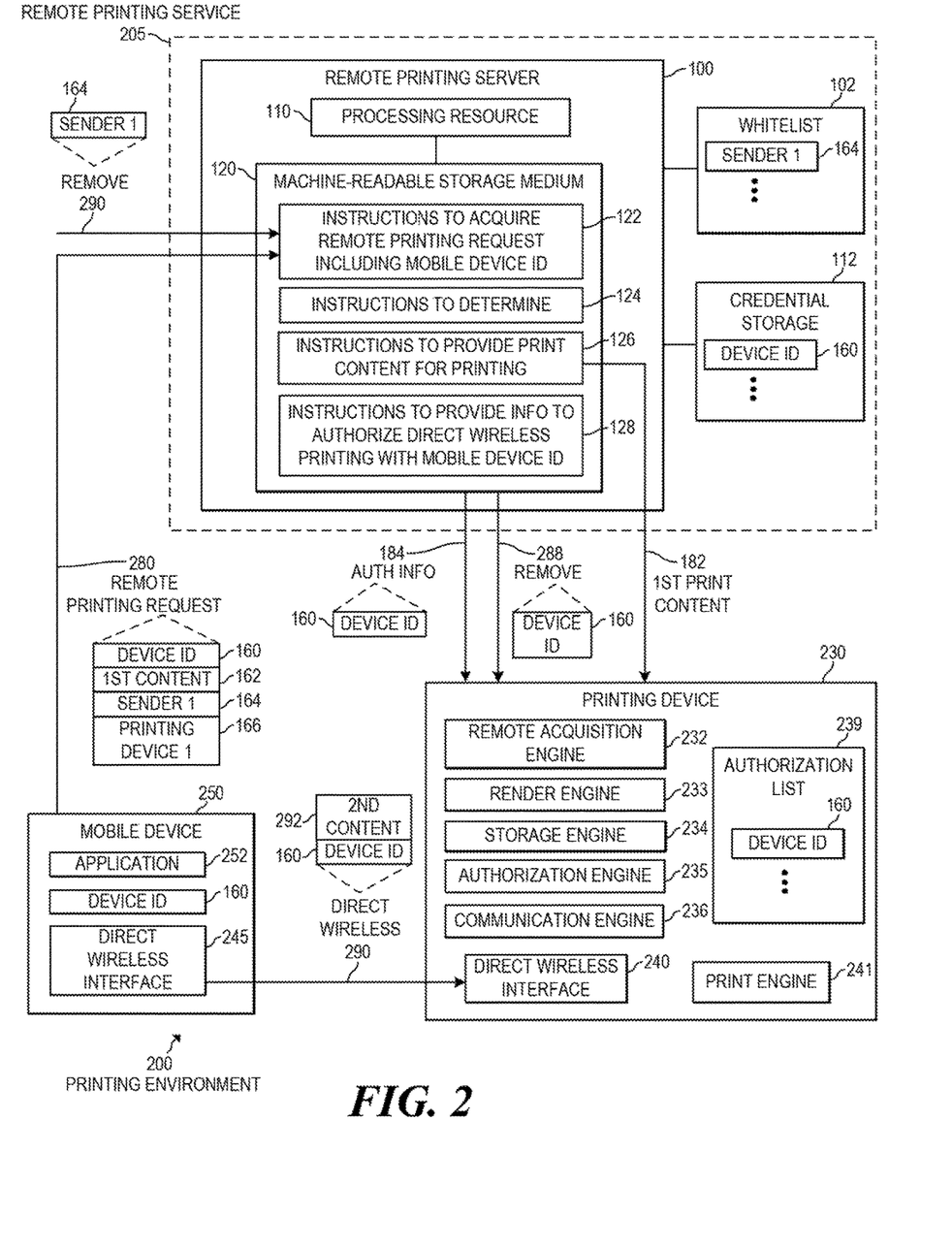
FIG. 2 is a block diagram of an example printing environment to authorize printing of print content received via direct wireless communication at a printing device.

FIG. 2 is block diagram of an example printing environment 200 to authorize printing of print content received via direct wireless communication at a printing device. In the example of FIG. 2, printing environment 200 comprises a remote printing service 205, a printing device 230, and a mobile device 250.

Remote printing service 205 is at least partially implemented by remote printing server 100, as described above in relation to FIG. 1. In some examples, remote printing service 205 may be implemented by one or more computing devices, including one or more remote printing servers, including remote printing server 100. In the example of FIG. 2, remote printing server 100 may be in communication with a whitelist 102 for printing device 230 and credential storage 112. Each of whitelist 102 and credential storage 112may be implemented by remote printing server 100 or at least one other computing device remote from but accessible to server 100. In some examples, each of whitelist 102 and credential storage 112may be implemented by at least one machine-readable storage medium and may be accessible to server 100 via any suitable computer network.

In the example of FIG. 2, printing device 230 includes engines 232-236. Each of engines 232-236 of printing device 230 may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 232-236. In such examples, printing device 230 may include the machine-readable storage medium storing the instructions and the processing resource to execute the instructions, or the machine-readable storage medium may be separate but accessible to printing device 230 and the processing resource. In other examples, the functionalities of any of the engines may be implemented in the form of electronic circuitry.

In some examples, the instructions can be part of an installation package that, when installed, can be executed by the processing resource to implement engines 232-236. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on printing device 230 including the processing resource. In such examples, the machine-readable storage medium may include memory such as a hard drive, solid state drive, or the like.

In the example of FIG. 2, printing device 230 further includes a print engine 241. Print engine 241 may comprise any combination of hardware and programming to implement the functionalities described herein in relation to engine 241, including at least hardware to physically produce graphical representation(s) (e.g., text, images, etc.) on paper, or the like. In some examples, printing device 230 may include additional engines. Printing device 230 also includes a direct wireless interface 240. In examples described herein, a direct wireless interface may comprise any combination of hardware and programming to perform at least the functionalities of communicating with other direct wireless interface(s) via direct wireless communication, as described above.

In the example of FIG. 2, mobile device 250 may comprise an application 252, a mobile device identifier 160 associated with mobile device 250, and a direct wireless interface 245, as described above. Mobile device identifier 160 may be any suitable identifier associated with mobile device 250, as described above in relation to FIG. 1. In some examples, application 252 may be any type of software (implemented in the form of instructions encoded on a machine-readable storage medium and executable by a processing resource of mobile device 230) to determine mobile device identifier 160 of mobile device 250 and provide a remote printing request 280, including or otherwise identifying mobile device identifier 160, to remote printing service 205. In the example of FIG. 2, remote printing request 280 may comprise mobile device identifier 160, first print content 162, identification 164 of the sender of the request, and identification 166 of the destination printing device. In the example of FIG. 2, identification 166 may identify (e.g., may be associated with) printing device 230.

As described above in relation to request 180, in some examples, remote printing request 280 may comprise an email message provided by the mobile device. In such examples, application 252 may be an application to send an email messages (e.g., via Simple Mail Transfer Protocol (SMTP)), such as an email client, or the like. In such examples, application 252 may send an email (directly or indirectly) to remote printing service 205 as remote printing request 280. In such examples, in response to user inputs, application 252 may create the email request 280 including first print content 162 as an attachment to the email, and including mobile device identifier 160 (e.g., in the email header), as described above. In such examples, application 252 may determine mobile device identifier 160 of mobile device 250, and include the identifier 160 in the email request 280. In some examples, the email request 280 may, as described above, include an email address of the sender as the sender identification 164, and may include an email address associated with destination printing device 230 as the printing device identification 166.

In other examples, as described above, remote printing request 280 may comprise an API function call to a print request function of an API of the remote printing service. In such examples, application 252 may be a printing application of mobile device 250 to provide remote printing requests to remote printing service 205. The API function call may be provided to remote printing service 205 via HTTP, or any other suitable protocol in such examples, remote printing request 280 may include,as function call parameters of the API function call, first print content 162, and destination printing device identification 166 and other information (such as a security token, as described above) identifying mobile device identifier 160 and sender identification 164. In some examples, the other information included in the API function call and identifying mobile device identifier 160 and sender identification 164 may be a security token, or the like, as described above in relation to FIG. 1. In such examples, the security token may be associated with mobile device identifier 160 and sender identification 164, such that remote printing server 100, for example, may retrieve mobile device identifier 160 and sender identification 164 based on the security token (e.g., from a security service). In some examples, the security token may also be used for authentication. In such examples, instructions 122 may acquire the API function call 280 provided by application 252 of mobile device 250.

In the example of FIG. 2, remote printing server 100 and mobile device 250 may communicate via any suitable computer network, and instructions 122 may (actively or passively) acquire remote printing request 280 from mobile device 250 via any suitable computer network. In such examples, instructions 124 may determine whether the identified printing request sender (i.e., associated with identification 164) is authorized to print on at least the identified destination printing device 230 (i.e., associated with identification 166) via remote printing service 205. For example, the remote printing service may maintain a list 102 (e.g., a whitelist 102) of authorized senders for the identified destination printing device 230, as described above in relation to FIG. 1. In some examples, in response to receiving remote printing request 280, instructions 124 may access whitelist 102 to determine whether the sender identified (e.g., by identification 164) in the print request 280 is authorized to print on destination printing device 280 via the remote printing service 250. In some examples, sender identification 164 may not be included in whitelist 102 for printing device 230. In such examples, instructions 124 may determine that the identified sender of request 280 is not authorized to print on destination printing device 230 via the remote printing service 205, and may not provide print content 162 to printing device 230. In other examples, instructions 124 may determine that the identified print request sender is authorized to print on a plurality of printing devices associated with the remote printing service, including the destination printing device, as described above in relation to FIG. 1.

In the example of FIG. 2, sender identification 164 (e.g., an email address of the sender) is included in whitelist 102 for printing device 230. In such examples, instructions 124 may determine that the identified sender of request 280 is authorized to print on destination printing device 230 via the remote printing service 205. In some examples, in response to the determination that the identified sender (associated with identification 164) is authorized, instructions 124 may store mobile device identifier 160 of request 280 in device credential storage 112, which is associated with (e.g., accessible to) remote printing server 100, as described above. In some examples, mobile device identifier 160 may be stored in credential storage 112 in association with printing device 230 (e.g., in association with an identifier for printing device 230) to indicate that mobile device 250 is authorized to print on printing device 230 via direct wireless communication.

Further, based on the determination that the sender of print request 280 is authorized to print on at least printing device 230 via remote printing service 205 instructions 126 may make a print-ready version 182 of the first print content 162 available to the destination printing device for printing in any suitable manner, as described above in relation to FIG. 1. As described above, remote printing service 205 may render first print content 162 to generate print-ready version 182, when first print content 162 is not in a print-ready format for printing device 230.

In the example of FIG. 2, remote acquisition engine 232 of printing device 230 may acquire,from remote printing service 205, the print-ready version 182 of first print content 162 of remote printing request 280 received by remote printing service 205 (e.g., server 100) from mobile device 250 and determined, by remote printing service 205, to be from a print request sender authorized to print on at least printing device 230 via remote printing service 205. For example, engine 232 may receive the print-ready version 182 provided to printing device 230 by instructions 126 of remote printing server 100 via a suitable computer network. In other examples, engine 232 may acquire the print-ready version 182 from storage accessible to printing device 230 via a computer network at an address or other reference acquired from server 100, for example. After engine 232 acquires print-ready version 182, a print engine 241 may print the print-ready version 182 of first print content 162 on a physical medium, such as paper, or the like.

As described above in relation to FIG. 1, instructions 128 may provide authorization information 184 to destination printing device 230 to authorize printing of at least second print content 292 received by printing device 230 from mobile device 205 via direct wireless communication 290, when at least mobile device identifier 160 is provided by mobile device 250 to printing device 230 via direct wireless communication in association with second print content 292. Remote printing server 100 and destination printing device 230 may communicate via any suitable computer network, and instructions 128 may provide authorization information 184 to destination printing device 230 via any suitable computer network. In the example of FIG. 1, authorization information 184, provided by instructions 128, may comprise any suitable information to cause the destination printing device to authorize printing of at least second print content received, with mobile device identifier 160, via direct wireless communication from a mobile device.

For example, based on a determination by instructions 124 that the identified printing request sender (i.e., associated with identification 164) of request 280 is authorized to print on identified printing device 230 via remote printing service 205, instructions 128 may provide authorization information 184 comprising mobile device identifier 160 to destination printing device 230 (as shown in FIG. 2). In such examples, instructions 128 may provide mobile device identifier 160 to printing device 230 in a manner to authorize printing of at least second print content 292 received, with at least mobile device identifier 160, by printing device 230 from mobile device 250 via direct wireless communication.

For example, printing device 230 may maintain an authorization list 239 including mobile device identifiers associated with respective mobile devices authorized to print on printing device 230 via direct wireless communication. In such examples, when the destination printing device receives print content with a mobile device identifier via direct wireless communication, the destination printing device may check authorization list 239 of for the provided mobile device identifier, and may print the print content if the provided mobile device identifier is in authorization list 239. In some examples, authorization list 239 may be implemented by at least one machine-readable storage medium included on printing device 230 (i.e., local to printing device 230).

In some examples, based on a determination by instructions 124 that the sender (i.e., associated with identification 164) of request 280 is authorized to print on device 230 via service 205, instructions 128 may provide mobile device identifier 160 to printing device 230 such that printing device 230 stores mobile device identifier 160 in authorization list 239 to authorize mobile device 250 associated with mobile device identifier 160 to print on the destination printing device via direct wireless communication. For example, instructions 128 may provide mobile device identifier 160 to printing device 230 in an API function call of an API of printing device 230 to cause printing device 230 to store mobile device identifier 160 in authorization list 239. In some examples, instructions 128 may provide mobile device identifier 160 to printing device 230 based on the determination by instructions 124 that the sender of request 280 is authorized to print on device 230 via service 205, by providing mobile device identifier 160 to printing device 230 with the print-ready version 182 of first print content 162.

In other examples, instructions 128 may provide mobile device identifier 160 to printing device 230, based on the determination by instructions 124 that the sender of request 280 is authorized to print on device 230 via service 205, by providing mobile device identifier 160 to printing device 230 after receiving an indication from printing device 230 that first print content 162 (previously provided to printing device 230 based on the determination) was successfully printed by printing device 230, in such examples, instructions 128 may provide mobile device identifier 160 to printing device 230, based on the determination by instructions 124 that the sender of request 280 is authorized to print on device 230 via service 205, and based on the indication that first print content 162 was successfully printed.

Referring to printing device 230 of FIG. 2, in examples in which instructions 128 provide mobile device identifier 160 to printing device 230, remote acquisition engine 232 of printing device 230 may acquire (e.g., receive), from remote printing server 100, the mobile device identifier 160 associated with mobile device 250 and identified via (e.g., included in) remote print request 280. In such examples, storage engine 234 may store the acquired mobile device identifier 160 in authorization list 239 in local memory (e.g., in a machine-readable storage medium) of printing device 230. In such examples, by storing mobile device identifier 160 in authorization list 239, printing device 230 may authorize mobile device 250 (associated with identifier 160) to print on printing device 230 via direct wireless communication.

In the example of FIG. 2, a communication engine 236 may actively acquire (e.g., retrieve, etc.) or passively acquire (e.g., receive, etc.) second print content 292 and mobile device identifier 160 from mobile device 250 via direct wireless communication 290 between mobile device 250 and printing device 230. In some examples, second print content 292 and may be provided, with mobile device identifier 160, from mobile device 250 to printing device 230 via direct wireless communication. In some examples, second print content 292 and mobile device identifier 160 may be provided from mobile device 250 to printing device 230 via one or more messages communicated via the direct wireless communication. In such examples, mobile device identifier 160 may be provided to printing device 230 in association with second print content 292 via the direct wireless communication. For example, mobile device identifier 160 and second print content 292 may be provided to printing device 230 in the same communication, communication session, connection, or the like, or in any other manner linking or associating second print content 292 with mobile device identifier 160.

In response to receiving at least mobile device identifier 160, authorization engine 235 may determine whether at least mobile device identifier 160, acquired with (or in association with) second print content 292 via direct wireless communication, is stored in authorization list 239. In the example of FIG. 2, mobile device identifier 160 is stored in authorization list 239. In such examples, in response to receiving at least mobile device identifier 160, authorization engine 235 may determine that at least mobile device identifier 160, acquired with (or in association with) second print content 292 via direct wireless communication, is stored in authorization list 239. In response to this determination, authorization engine 235 may cause the print engine 241 to print second print content 292.

In some examples described herein, authorization engine 235 may determine that the mobile device 250 providing mobile device identifier 160 is authorized to print on printing device 230 via direct wireless communication based on the presence of mobile device identifier 160 in authorization list 239, independent of (i.e., without) any further input to the printing device after the direct wireless communication of mobile device identifier 160. In this manner, examples described herein may simplify the process of becoming authorized to print via direct wireless communication utilizing a remote printing service.

In some examples, printing device 230 may receive second print content 292 from mobile device 250 in a print-ready format for printing device 232. In other examples, printing device 230 may receive second print content 292 from mobile device 205 in a format that is not a print-ready format for printing device 232. In such examples, render engine 233 of printing device 230 may render the acquired second print content 292 into a print-ready format for printing device 230. In such examples, print engine 241 may print the print-ready version 182 of second print content 292 in response to the determination that mobile device identifier 160 is included in authorization list 239.

In some examples, authorization engine 235 may prevent printing device 230 from printing third print content received via direct wireless communication with (or in association with) another mobile device identifier not stored in authorization list 239. In such examples, in response to acquiring the other mobile device identifier, engine 235 may determine that the other mobile device identifier is not present in authorization list 239 and, in response to the determination, prevent printing device 230 from printing third print content received, via direct wireless communication, with (or in association with) the other mobile device identifier.

In other examples, when printing device 230 receives print content in association with a mobile device identifier via direct wireless communication, printing device 230 may contact remote printing service 205 to determine whether the mobile device providing the mobile device identifier is authorized to print on printing device 230 via direct wireless communication. In such examples, in response to communication engine 236 acquiring mobile device identifier 160 in association with second print content 292 from mobile device 250 via direct wireless communication 290, authorization engine 235 may provide, to remote printing service 205, a request to determine whether printing of second print content 292 received in association with mobile device identifier 160 via direct wireless communication is authorized.

In such examples, referring to remote printing server 100, instructions 128 may acquire (e.g., receive), from printing device 230, the request to determine whether printing of second print content 292 received by printing device 230 in association with mobile device identifier 160 via direct wireless communication is authorized.

In response to the request, instructions 124 may determine whether mobile device identifier 160 is associated with printing device 230 in device credential storage 112 associated with remote printing server 100. In the example of FIG. 2, mobile device identifier 160 is associated with printing device 230 in device credential storage 112 as a result of being stored in storage 112 by instructions 124 based on the prior determination that sender identification 164 was included in whitelist 102 in response to remote printing request 102. In such examples, in response to the determination that mobile device identifier 160 is associated with printing device 230 in device credential storage 112, instructions 128 may provide an indication (i.e., authorization information 184 indicating) to printing device 230 that the printing of second print content 292 received via direct wireless communication is authorized. In response to this indication, authorization engine 235 of printing device 230 may cause print engine 241 to print second print content 292. In examples in which mobile device identifier 160 is not associated with printing device 230 in device credential storage 112, instructions 128 may provide authorization information 184 to printing device 230 indicating that the printing of second print content 292 is not authorized and, in response, authorization engine 235 of printing device 230 may prevent printing device 230 (i.e., print engine 241) from printing second print content 292.

In other examples, the authorization of a mobile device to print via direct wireless communication may be based on both a mobile device identifier and a mobile device user identifier. In this manner, particular user(s) of a mobile device may be authorized to print on a printing device via direct wireless communication, rather than any user of a given mobile device. For example, remote printing request 280 may additionally include a mobile device user identifier associated with mobile device 250, which may be any suitable information identifying a user of mobile device 250 that initiated the request 280. In such examples, based on the determination that the sender of print request 280 is authorized to print on printing device 230 via remote printing service 205, instructions 124 may store both the mobile device user identifier and the mobile device identifier 160 in association with a printing device in credential storage 112.

Also, in some examples, based on the determination that the sender is authorized, instructions 128 may provide mobile device identifier 160 and the mobile device user identifier to destination printing device 230 to authorize printing of print content received by printing device 230, in association with mobile device identifier 160 and the mobile device user identifier, from mobile device 250 via direct wireless communication. In such examples, remote acquisition engine 232 may acquire, from remote printing server 100, a mobile device user identifier associated with mobile device 250 and included in remote print request 280. Storage engine 234 may store the acquired mobile device user identifier in authorization list 239 in association with mobile device identifier 160.

In such examples, communication engine may acquire the mobile device user identifier with mobile device identifier 160, both in association with the second print content 292, from mobile device 250 via direct wireless communication between mobile device 250 and printing device 230. In such examples, authorization engine 235 may cause print engine 241 to print second print content 292 in response to a determination that the mobile device user identifier is stored in authorization list 239 in association with mobile device identifier 160. The mobile device user identifier may be equivalent to or different from sender identification 164. In some examples, sender identification 164 may be used as the mobile device user identifier.

Referring to remote printing server of FIG. 2, in some examples, instructions 122 may (actively or passively) acquire a request 290 to remove the authorization of the print request sender (associated with identification 164) to print on printing device 230 via remote printing service 205. In such examples, in response to request 290, instructions 128 may instruct printing device 230 to remove mobile device identifier 160 (or mobile device identifier 160 and an associated mobile device user identifier) from authorization list 239. In response, engine 234 of printing device 230 may remove mobile device identifier 160 (or mobile device identifier 160 and the associated mobile device user identifier) from authorization list 239. In such examples, remote printing service 205 may store an association between sender identification 164 and mobile device identifier 160 (and mobile device user identifier, in some examples) such that mobile device identifier 160 (and mobile device user identifier, in some examples) may be removed from authorization list 239 in response to the request to remove the authorization of the print request sender associated with identification 164 for printing on printing device 230, as described above. In some examples, functionalities described herein in relation to FIG. 2 may be provided in combination with functionalities described herein in relation to any of FIGS. 1 and 3-4.

Figure 3:
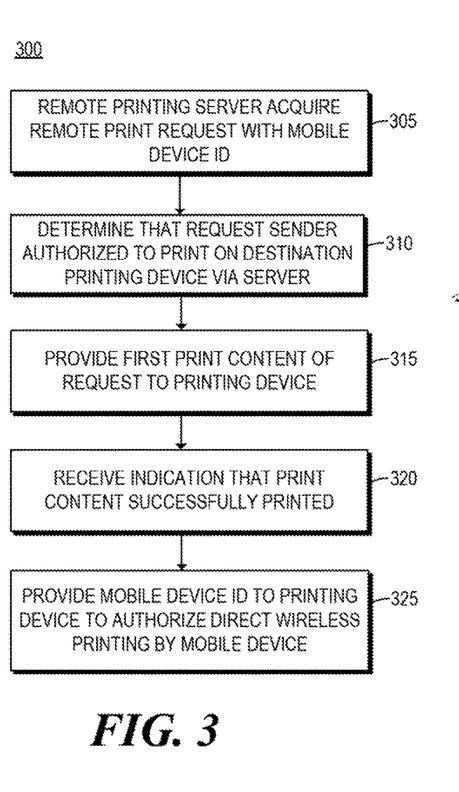
FIG. 3 is a flowchart of an example method for providing a mobile device identifier to a printing device to authorize direct wireless printing by the mobile device.

FIG. 3 is a flowchart of an example method 300 for providing a mobile device identifier to a printing device to authorize direct wireless printing by the mobile device. Although execution of method 300 is described below with reference to server 100 of FIG. 1 described above, other suitable systems for the execution of method 300 can be utilized. Additionally, implementation of method 300 is not limited to such examples.

At 305 of method 300, instructions 122 of remote printing server, at least partially implementing a remote printing service, may acquire a remote printing request 180 from a mobile device, the remote printing request 180 comprising first print content 162 and identifying a print request sender, a destination printing device, and a mobile device identifier 160 associated with the mobile device. At 310, instructions 124 may determine that the identified print request sender is authorized to print on at least the destination printing device via the remote printing service.

At 315, in response to the determination, instructions 126 may provide a print-ready version 182 of first print content 162 to the destination printing device for printing. At 320, instructions 126 may receive an indication that first print content 160 was successfully printed by the destination printing device. At 325, in response to the indication, instructions 128 may provide mobile device identifier 160 to the destination printing device to authorize printing of at least second print content received, with the mobile device identifier, by the destination printing device from the mobile device via close-proximity, direct wireless communication.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
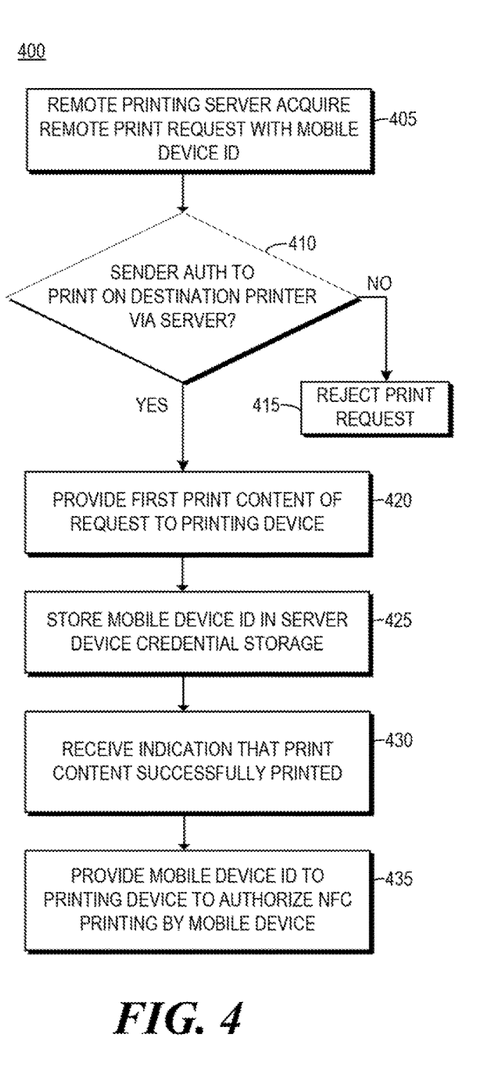
FIG. 4 is a flowchart of an example method for providing a mobile device identifier, included in a remote printing request, to a printing device to authorize direct wireless printing by the mobile device.

FIG. 4 is a flowchart of an example method 400 for providing a mobile device identifier, included in a remote printing request, to a printing device to authorize direct wireless printing by the mobile device. Although execution of method 400 is described below with reference to server 100 of FIG. 2 described above, other suitable systems for the execution of method 400 can be utilized. Additionally, implementation of method 400 is not limited to such examples.

At 405 of method 400, instructions 122 of remote printing server, at least partially implementing a remote printing service, may acquire a remote printing request 180 from a mobile device, the remote printing request 180 comprising first print content 162 and identifying a print request sender, a destination printing device, and a mobile device identifier 160 associated with the mobile device.

At 410, instructions 124 may determine whether the identified print request sender is authorized to print on at least the destination printing device via the remote printing service. In the example of FIG. 4, the remote printing request may comprise an email including an email address of the print request sender, which may identify the sender of the request 180, and may comprise the mobile device identifier. At 410, instructions 124 may determine whether the identified print request sender is authorized to print on the destination printing device via the remote printing service based on whether the email address of the print request sender is included in a whitelist 102 for the destination printing device.

if the sender's email address is not included in the whitelist 102, then the sender is not authorized and method 400 may proceed to 415, where instructions 124 may reject remote printing request 180 such that first print content 162 is not printed at the destination printing device. If it is determined at 410 that the sender's email address is included in the whitelist 102, and thus authorized, then method 400 may proceed to 420. At 420, in response to the determination, instructions 126 may provide a print-ready version 182 of first print content 162 to the destination printing device for printing.

At 425, in response to the determination, instructions 124 may store mobile device identifier 160 in device credential storage 122 and in association with the remote printing server. At 430, instructions 126 may receive an indication that first print content 160 was successfully printed by the destination printing device. At 435, in response to the indication, instructions 128 may provide mobile device identifier 160 to the destination printing device to authorize printing of at least second print content received, with the mobile device identifier, by the destination printing device from the mobile device via close-proximity, direct wireless communication, such as NFC.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with, functionalities described herein in relation to any of FIGS. 1-3.

What is claimed is:

1. A non-transitory machine-readable storage medium comprising instructions executable by a processing resource, of a remote printing server to implement a remote printing service, to:
    acquire a remote printing request from a mobile device, the remote printing request comprising first print content and identifying a print request sender, a destination printing device, and a mobile device identifier associated with the mobile device;
    determine that the identified print request sender is authorized to print on at least the destination printing device via the remote printing service;
    based on the determination that the print request sender is authorized, make a print-ready version of the first print content available to the destination printing device for printing; and
    provide authorization information to the destination printing device with the print-ready version of the first content to authorize printing of at least second print content received by the destination printing device from the mobile device via direct wireless communication, when at least the mobile device identifier is provided by the mobile device to the destination printing device via the direct wireless communication in association with the second print content, wherein the authorization information is different from and separate from the first print content and the print-ready version of the first print content.

2. The storage medium of claim 1, wherein the instructions to provide the authorization information comprise instructions to:
    based on to the determination that the print request sender is authorized, provide the mobile device identifier to the destination printing device to authorize printing of at least the second print content received, with at least the mobile device identifier, by the destination printing device from the mobile device via the direct wireless communication.

3. The storage medium of claim 1, wherein the instructions to provide the authorization information comprise instructions to:

acquire, from the destination printing device, a request to determine whether printing of the second print content, received in association with the mobile device identifier, by the destination printing device from the mobile device via the direct wireless communication is authorized; and in response to a determination that the mobile device identifier is associated, with the destination printing device in device credential storage associated with the remote printing service, provide an indication to the destination printing device that the printing of the second print content received via the direct wireless communication is authorized.

4. The storage medium of claim 1, wherein the remote printing request comprises an application programming interface (API) function call acquired from a printing application of the mobile device.

5. The storage medium of claim 1, wherein the instructions to provide the authorization information comprise instructions to:

provide the mobile device identifier and a mobile device user identifier associated with the mobile device to the destination printing device to authorize printing of at least second print content received, with the mobile device identifier and the mobile device user identifier, by the destination printing device from the mobile device via the direct wireless communication.

6. The storage medium of claim 1, wherein:

the instructions to acquire comprise instructions to acquire a request to remove the authorization of the print request sender to print on the destination printing device via the remote printing service; and the instructions to provide authorization information comprise instructions to, in response to the request to remove the authorization, instruct the destination printing device to remove the mobile device identifier from an authorization list, stored in local memory of the printing device, of mobile device identifiers associated with mobile devices authorized to print on the printing device via the direct wireless communication.

7. A printing device comprising:
a processor;
a print engine coupled to the processor; and
a non-transitory machine-readable storage medium coupled to the processor and comprising instructions executable by the processor to:

acquire, from a remote printing service, a print-ready version of first print content of a remote printing request received by the remote printing service from a mobile device and determined, by the remote printing service, to be from a print request sender authorized to print on at least the printing device via the remote printing service, the print engine to print the print-ready version of the first print content;

indicate to the remote printing service whether the print-ready version of the first print content is successfully printed and, if successfully printed, to acquire, from the remote printing service, a mobile device identifier associated with the mobile device and included in the remote print request, the mobile device identifier different from and separate from the first print content and the print-ready version of the first print content, and store the acquired mobile device identifier in an authorization list in local memory of the printing device;

acquire second print content and the mobile device identifier from the mobile device via direct wireless communication between the mobile device and the printing device; and cause the print engine to print the second print content in response to a determination that at least the mobile device identifier, acquired with the second print content via the direct wireless communication, is stored in the authorization list.

8. The printing device of claim 7, wherein the instructions are further to:

acquire, from the remote printing service, a mobile device user identifier associated with the mobile device and identified via the remote print request; and store the acquired mobile device user identifier in the authorization list.

9. The printing device of claim 8, wherein the instructions are further to:

acquire the mobile device user identifier with the mobile device identifier, both in association with the second print content, from the mobile device via the direct wireless communication between the mobile device and the printing device; and cause the print engine to print the second print content in response to a determination that the mobile device user identifier is stored in the authorization list in association with the mobile device identifier.

10. The printing device of claim 7, wherein:

the second print content received from the mobile device is received in a print-ready format for the printing device; and wherein the instructions are further to prevent the printing device from printing third print content received via the direct wireless communication in association with another mobile device identifier not stored in the authorization list.

11. The printing device of claim 7, further comprising:
a direct wireless communication interface;
wherein the instructions are further to render the acquired second print content into a print-ready format for the printing device; and wherein the print engine is to print the print-ready version of the second print content in response to the determination.

12. A method performed by a remote printing server implementing a remote printing service, the method comprising:

acquiring, with the remote printing server, a remote printing request from a mobile device, the remote printing request comprising first print content and identifying a print request sender, a destination printing device, and a mobile device identifier associated with the mobile device;

determining that the identified print request sender is authorized to print on at least the destination printing device via the remote printing service;

in response to the determination, providing a print-ready version of the first print content to the destination printing device for printing;

receiving an indication that the first print content was successfully printed by the destination printing device; and in response to the indication, providing the mobile device identifier to the destination printing device to authorize printing of at least second print content received, with the mobile device identifier, by the destination printing device from the mobile device via close-proximity, direct wireless communication, wherein the authorization information is different from and separate from the first print content and the print-ready version of the first print content.

13. The method of claim 12, wherein:
the remote printing request comprises an email including an email address of the print request sender and the mobile device identifier; and
the determining comprises:
  determining that the identified print request sender is authorized to print on the destination printing device via the remote printing service when the email address of the print request sender is included in a whitelist for the destination printing device.

14. The method of claim 13, further comprising:
in response to the determination, storing the mobile device identifier in device credential storage associated with the remote printing server;
wherein the close-proximity, direct wireless communication comprises near field communication (NFC).

15. The printing device of claim 7, wherein the mobile device identifier is usable by the printing device to authorize the second print content to be printed on the print engine.

16. The storage medium of claim 1, wherein the instructions to provide the authentication information further comprise instructions to provide the authorization information in response to receipt of an indication from the destination printing device that the first print content has been successfully printed by the destination printing device.

17. The storage medium of claim 1, wherein the remote printing request is acquired, over a network, directly from the mobile device.

* * * * *